J. E. REDFORD.
AUTOMATIC SLACK ADJUSTER.
APPLICATION FILED JUNE 12, 1919.
1,381,932.
Patented June 21, 1921.
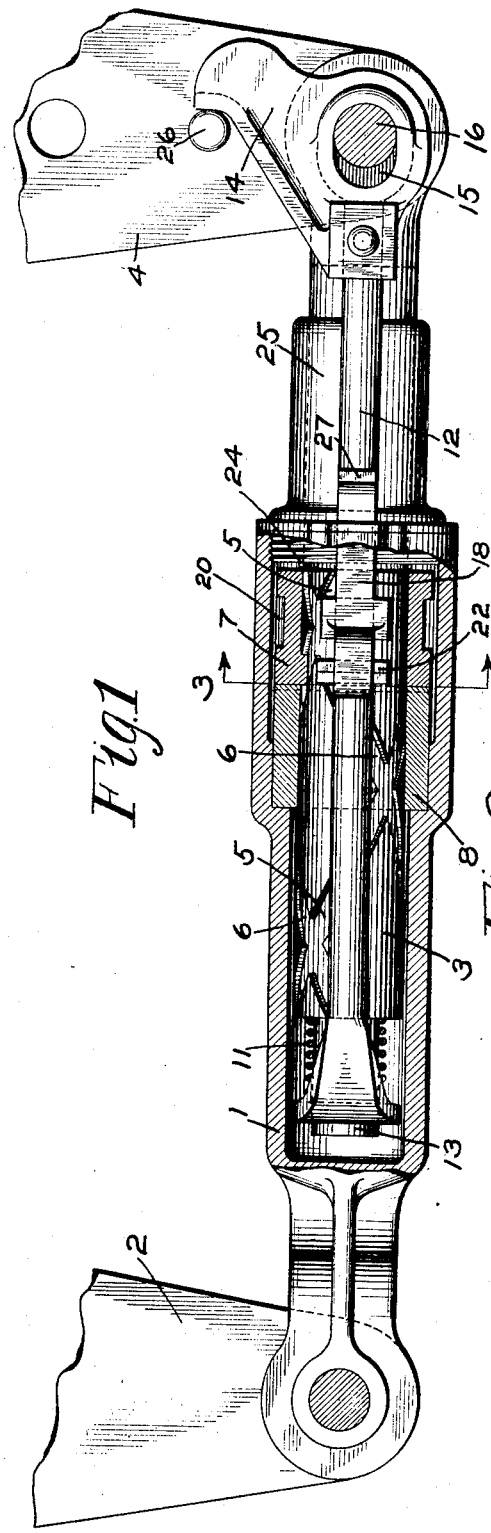
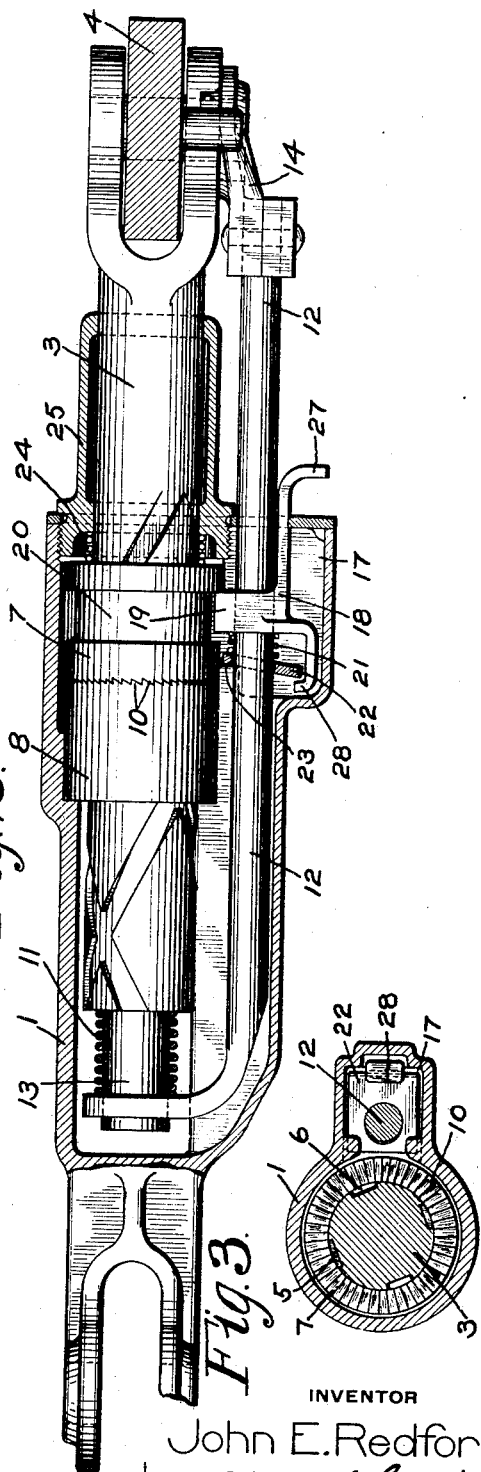
INVENTOR
John E. Redford
by Wm. M. Cady
Atty.

UNITED STATES PATENT OFFICE.

JOHN E. REDFORD, OF KINLOCH, MISSOURI, ASSIGNOR TO AMERICAN BRAKE COMPANY, OF ST. LOUIS, MISSOURI, A CORPORATION OF MISSOURI.

AUTOMATIC SLACK-ADJUSTER.

1,381,932.  Specification of Letters Patent.  Patented June 21, 1921.

Application filed June 12, 1919. Serial No. 303,739.

*To all whom it may concern:*

Be it known that I, JOHN E. REDFORD, a citizen of the United States, residing at Kinloch, in the county of St. Louis and State of Missouri, have invented new and useful Improvements in Automatic Slack-Adjusters, of which the following is a specification.

This invention relates to slack adjusters for automatically taking up the slack due to the wear of the brake shoes on the wheels of a moving vehicle.

The principal object of my invention is to provide an improved automatic slack adjuster, of the above character.

In the accompanying drawing; Figure 1 is a side elevation, partly in section, of a slack adjuster embodying my invention; Fig. 2 a plan view thereof, partly in section; and Fig. 3 a section on the line 3—3 of Fig. 1.

As shown in the drawing and according to my invention, the usual bottom rod is replaced by an automatically adjustable bottom rod member comprising a casing 1, pivotally connected to one brake lever 2 and a rod 3, extending into the casing 1 and pivotally connected to the other brake lever 4.

The rod 3 is provided with right and left hand spiral grooves 5 and 6, a nut 7 being adapted to engage the right hand spiral groove 5 and a nut 8 the left hand spiral groove 6.

The pitch of the spiral grooves is such that the nuts will revolve freely around the rod 3 when force is applied longitudinally to said rod.

The nuts 7 and 8 are locked together against movement in one direction by means of coöperating teeth 10.

A coil spring 11, adapted to be compressed, is mounted on the rear end portion 13 of the rod 3, which is of reduced diameter for that purpose, and a rod 12 is provided with an arm having an aperture through which the end portion 13 is adapted to pass, so that longitudinal movement of the rod 12 will compress the spring 11.

The opposite end of the rod 12 is connected to an arm 14, having a longitudinally elongated slot 15 within which plays the pivot pin 16 of the brake lever 4.

Within a pocket 17 of the casing 1, a trigger member 18 is mounted, having a lug 19 which is adapted to engage an annular groove 20 of the nut 7.

The member 18 is slidably mounted on the rod 12 and acts as an abutment for a spring 21, the opposite end of which bears against a tilting ring 22, mounted on the rod 12. At one side, the tilting ring 22 engages a projection 23 on the casing 1, so that the spring 21 tends to tilt the ring and grip the rod 12, as shown in Fig. 2 of the drawing.

A light coil spring 24 is mounted on the rod 3 and acts on the nut 7, tending to maintain the nuts 7 and 8 in locking engagement, the opposite end of the spring being held by a cup 25 which incloses the rod 12 and is screwed into the casing 1.

In operation, when the brakes are applied, if there has been no wear of the brake shoes, the angular movement of the brake levers with respect to the bottom rod will cause the pin 26 to engage the arm 14, but without effecting any movement of the arm. If, however, there is brake shoe wear, the further angular movement of the brake levers due to such wear, will cause the pin 26 to move the arm 14 and thereby the rod 12.

The longitudinal movement of the rod 12 then operates to compress the spring 11, the tilting ring 22 gripping the rod 12 so as to take up this movement and prevent any return movement of the rod.

During this excess movement of the parts, the arm 14 moves away from the pin 16, so that a clearance space is created at the right hand side of the pin 16, due to the elongated slot 15.

Upon releasing the brakes, the force due to the compression of the spring 11 acts on the rod 3 and pushes the same forwardly. Since the rod is prevented from rotating by its engagement with the brake lever 4, the forward movement of the rod operates to rotate the nut 8 in a direction such that the teeth 10 can disengage, this disengagement being permitted by the fact that the nut 7 is free to move away by merely compressing the light spring 24.

The movement of rod 3 and the rotation of nut 8 continues until the clearance at the right of pin 16 has been taken up.

The rotation of the nut 8 causes the teeth 10 to ride into and out of engagement to the extent of one or more teeth, according to the amount of slack which is taken up.

The rod 3 having thus been pulled out, the bottom rod member is lengthened, and in again applying the brakes the rod 3 is securely locked with respect to the casing 1, in the adjusted position, by the engagement of the teeth 10 of the nuts 7 and 8, which prevents movement of the rod 3 in the direction which would shorten the bottom rod member.

The device may be adjusted manually so as to shift the rod 3 in either direction for taking up slack manually or so as to permit new brake shoes to be applied, by means of the trigger member 18.

By pulling on the finger hold 27 of the trigger member 18, the nut 7 may be retracted out of engagement with the nut 8, through the action of the lug 19 in the groove 20 of the nut 7, and it will be evident that with the nuts 7 and 8 separated, the rod 3 may be readily shifted in either direction.

The trigger member 18 is also provided with a projection 28, which is adapted to engage the tilting ring 22 and hold same inoperative while the adjustment of the rod 3 is being effected.

Upon releasing the trigger 18, the spring 24 returns the nut 7 to its locking position with the nut 8, while the spring 21 returns the tilting ring 22 to its normal operating position.

Having now described my invention, what I claim as new, and desire to secure by Letters Patent, is:

1. In an automatic slack adjuster, the combination with a pair of brake levers and a bottom rod comprising longitudinally adjustable members connected to the ends of said levers, of a spring acting on one of said members, a rod operated by excess movement of the brake levers in applying the brakes for compressing said spring, and a clutch mechanism for preventing relative longitudinal movement of said members in one direction.

2. In an automatic slack adjuster, the combination with brake levers, of a bottom rod comprising a casing connected to the end of one lever, a member connected to the end of the other lever and extending into and movable relatively to the casing, a spring acting on said member, means operated by excess movement of the brake levers in applying the brakes for compressing said spring, and a device for locking said member against movement relative to the casing in applying the brakes.

3. In an automatic slack adjuster, the combination with brake levers, of a rod connected to one brake lever and having a right hand and a left hand spiral groove, a spring tending to move said rod for taking up slack, a nut engaging each groove, and coöperating teeth on the meeting faces of said nuts adapted to lock the nuts against rotation in one direction.

4. In an automatic slack adjuster, the combination with brake levers, of a rod connected to one brake lever and having a right hand and a left hand spiral groove, a spring tending to move said rod for taking up slack, a nut engaging each groove, coöperating teeth on the meeting faces of said nuts adapted to lock the nuts against rotation in one direction, and yielding means for permitting one nut to move out of engagement with the other nut to permit rotation of the nuts.

5. In an automatic slack adjuster, the combination with brake levers, of a rod connected to one brake lever, a spring tending to move said rod for taking up slack, means operated by excess movement of the brake levers for compressing said spring, and a locking device for holding said rod in its adjusted position comprising nuts adapted to engage right and left hand spiral grooves on the rod, interlocking teeth on the meeting faces of the nuts for preventing rotation of the nuts, and yielding means acting on one nut for permitting movement of said nut to permit disengagement of the nuts and thereby the rotation of the nuts, so that the movement of the rod can be effected by the compressive force of said spring.

In testimony whereof I have hereunto set my hand.

JOHN E. REDFORD.